United States Patent [19]
Litke

[11] 3,867,037

[45] Feb. 18, 1975

[54] LINEAR MOTION ENCODER

[75] Inventor: E. David Litke, Andover, Mass.

[73] Assignee: Dynamics Research Corporation, Wilmington, Mass.

[22] Filed: Aug. 29, 1973

[21] Appl. No.: 392,816

[52] U.S. Cl................. 356/169, 350/172, 33/125 C
[51] Int. Cl. ........................................... G01b 11/04
[58] Field of Search ............ 356/169, 172; 250/237; 33/125 C, 1 R

[56] References Cited
UNITED STATES PATENTS

| 3,451,054 | 6/1969 | Johnson........................... 356/169 X |
| 3,579,836 | 5/1971 | Kraus............................ 356/169 UX |
| 3,658,429 | 4/1972 | Zipin.................................. 356/169 |

Primary Examiner—Ronald L. Wibert
Assistant Examiner—Paul K. Godwin
Attorney, Agent, or Firm—Weingarten, Maxham & Schurgin

[57] ABSTRACT

An electro-optical encoder providing uniform high sensitivity measurement of the magnitude and direction of linear motion along a travel path. A scale is arranged for motion along a longitudinal track within an encoder housing and relative to a reticle fixed in the housing. The effects of shaft misalignment are minimized by a coupler which is resilient in directions transverse to the axis of scale travel, while being rigid along the axis of travel as the scale moves along a grooved track within the housing.

13 Claims, 5 Drawing Figures

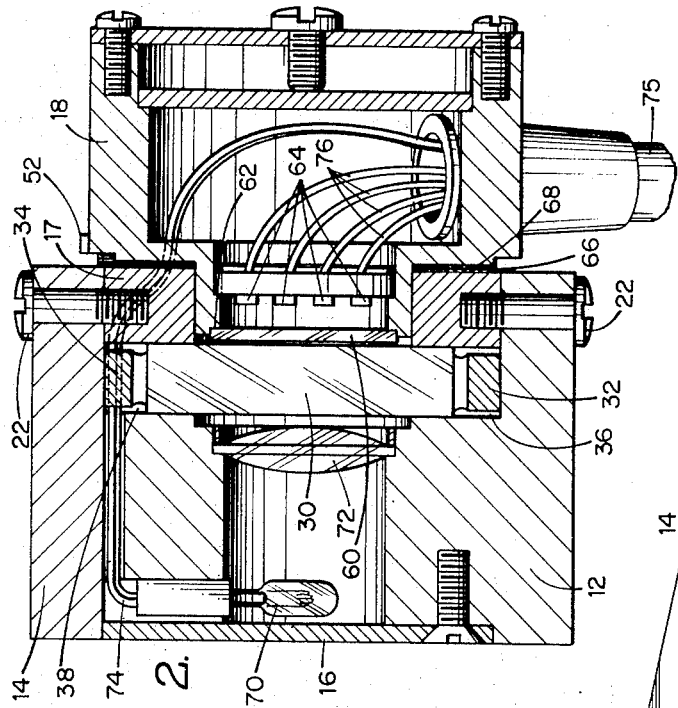
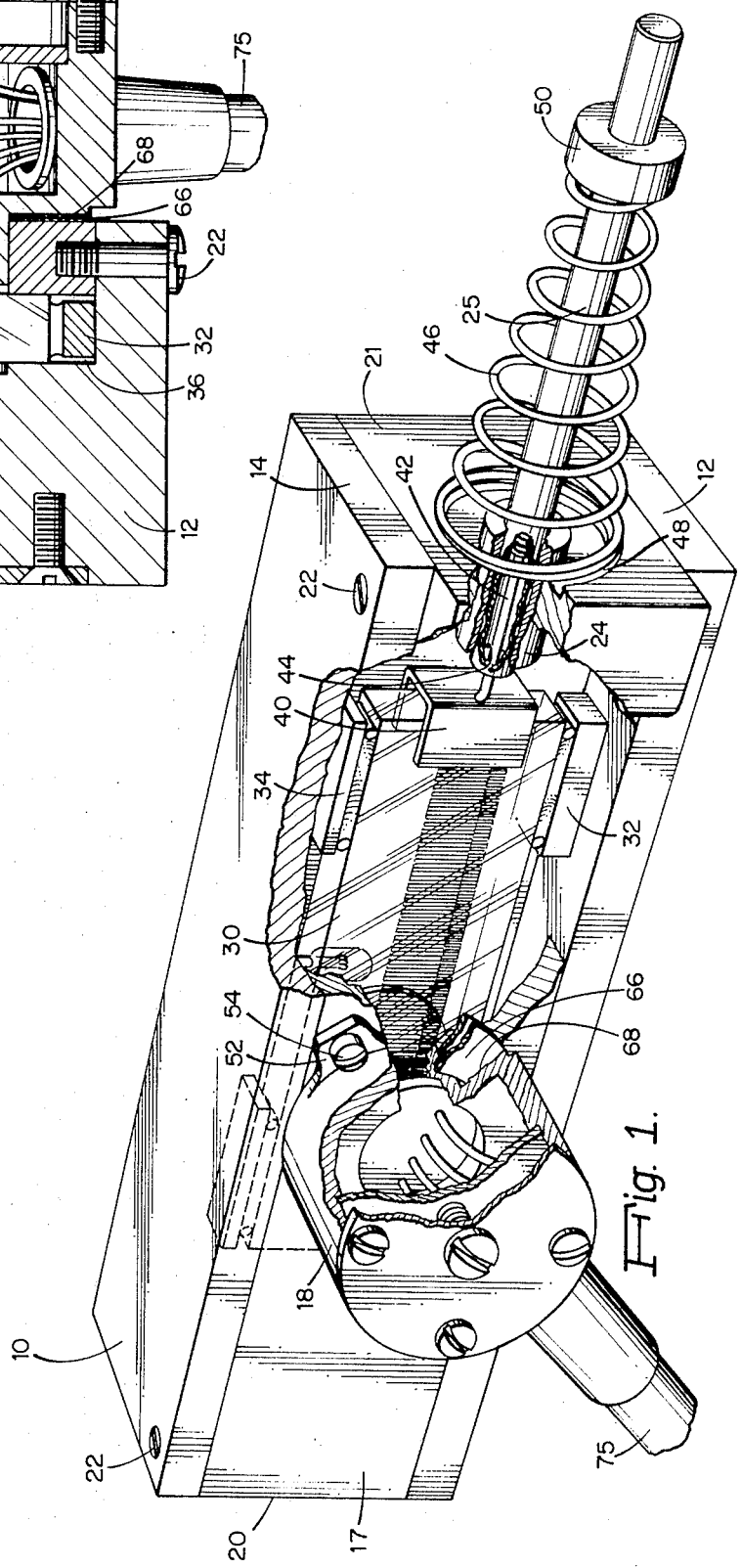

LINEAR MOTION ENCODER

FIELD OF THE INVENTION

This invention relates in general to position encoders, and more particularly to electro-optical linear encoders.

BACKGROUND OF THE INVENTION

Encoders are employed in a variety of applications to indicate the position of a moving element along a predetermined path. Linear encoders, in particular, provide an output indication of position along a linear travel path. In one class of encoders known as incremental encoders, light is directed through a scale having an array of regular rulings arranged along the length thereof and cooperative with a ruled reticle to produce an optical fringe pattern, tne movement of which is indicative of relative motion between the reticle and scale. The fringe pattern is sensed by one or more photosensors arranged to receive light from the optical pattern and operative to produce electrical signals representative or relative position. These signals are processed by associated electronic circuitry to provide intended output indications of position and sense of motion. Linear encoders are especially useful in monitoring the position of machine elements such as in systems for automatically controlling machine tool operation, and movement being measured is in many instances along a relatively short travel path.

SUMMARY OF THE INVENTION

Briefly, in accordance with the invention, a simple and economical and yet highly accurate electro-optical linear encoder is provided which is especially adapted for position measurement along a short travel path and suitable for operation in an adverse industrial environment. An optical assembly including a reticle is disposed within a surrounding housing, and an elongated scale having an array of rulings along the length thereof is also disposed within the housing and arranged for movement along a longitudinal track relative to the reticle and in spaced relation therewith. The scale is driven by an external member through a coupler which provides rigid longitudinal drive of the scale along the travel path and which is resilient in directions transverse to the axis of travel to minimize the effects of shaft misalignment. The reticle is adjustably mounted within the housing to provide a desired skew between scale and reticle rulings to produce an optically sensible fringe pattern. The housing interior is substantially isolated from external contamination by means of a seal through which a drive member connected to the coupler is movably disposed. The drive member may include restoring means to return the scale to a predetermined rest position.

BRIEF DESCRIPTION OF THE DRAWING

The invention will be more fully understood from the following detailed description, taken in conjunction with the accompanying drawing, wherein;

FIG. 1 is a partially cutaway pictorial view of a linear encoder constructed in accordance with the invention;

FIG. 2 is a sectional elevation view of the embodiment of FIG. 1;

DETAILED DESCRIPTION OF THE INVENTION

Figure 3:
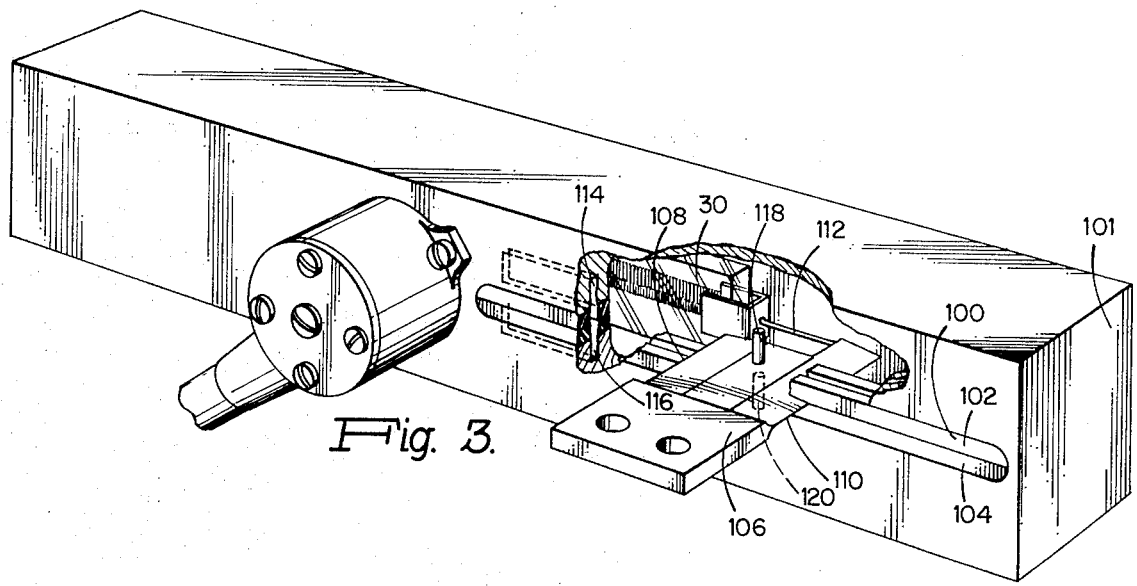
FIG. 3 is a partially cutaway pictorial view of an alternative embodiment of the invention.

The invention is illustrated in a preferred embodiment in FIGS. 1 and 2, wherein an enclosed and substantially sealed linear encoder is shown having a housing 10 comprised of first and second longitudinal base members 12 and 14, back member 16, front member 17 and first and second end members 20 and 21. Base members 12 and 14 may be conveniently formed of extruded sections of aluminum or other suitable material, while end members 20 and 21 may also be formed of any suitable material such as aluminum. Base members 12 and 14 and end members 20 and 21 are secured together to form housing 10 by machine screws 22 or other fastening means.

A generally cylindrical housing 18 is adjustably mounted to front member 17 and contains an optical assembly communicative with the interior of housing 10. End member 21 includes a bushing 24 through which a driving member 25 is disposed for longitudinal movement in sealing relation with the bushing.

A scale 30, which is made of a suitable transparent material such as glass having uniform, smooth surfaces, is disposed within housing 10 for longitudinal movement therein, and is supported by runners 32 and 34 disposed within respective grooves 36 and 38 defined by front member 17 and respective base members 12 and 14. Runners 32 and 34 are typically formed of hard coat aluminum and the bearing surfaces of the runners which engage confronting surfaces of base members 12 and 14 and front members 17 are coated with a dry lubricant, typically molybdinum disulfide, to reduce the frictional drag between the runners and the housing. The width of runners 32 and 34 is selected to be less than the width of respective grooves 36 and 38 by a predetermined amount to further reduce friction between the runners and the housing. Typically four runners are attached to respective bottom and top edges of scale 30 by an epoxy adhesive, and permit motion of scale 30 only along the longitudinal travel path.

An end plate 40 is affixed to the end of scale 30 adjacent end member 21 and is, in turn, attached to a longitudinal wire coupler 42 which is rigid in the longitudinal direction and resilient in directions transverse thereto. Coupler 42 is disposed within a recess 44 provided in the inner facing end of drive member 25 and is threadably attached thereto at the base of recess 44 as illustrated. The dimensions of recess 44 are selected to permit resilient motion of coupler 42 in directions transverse to the axis of motion in order to accomodate possible slight misalignment between the shaft and the scale. A coil spring 46 is disposed coaxially around drive member 25 and is seated at one end in a recess 48 in end member 21, and is retained at the opposite end by a plate 50 attached to drive 25. Spring 46 provides a restoring force to scale 30 to cause it to return to a predetermined rest position after removal of an applied force to drive member 25.

Housing 18 is affixed to front member 17 by a pair of mounting tabs 52 having apertures through which are inserted mounted screws 54 which engage suitably threaded openings in member 17. The apertures in mounting tabs 52 are larger in diameter than the mounting screws 54 to permit rotational adjustment of housing 18 within a selected range for purposes which will be hereinafter described.

A reticle 60 having a ruled pattern formed thereon is mounted within a recess 62 at the inner facing open end of housing 18 and in fixed spaced relationship with scale 30. An array of photosensors 64, typically of the photovoltaic type, is provided within housing 18 behind reticle 60 and is registration with the ruled pattern thereon.

The separation of reticle 60 from non-movable scale 30 is determined by one or more shims 66 between surface 68 of housing 18 and the confronting surface of front member 17. The amount of skew between respective ruled patterns on the scale and reticle is determined by the precise rotational position of housing 18 on front member 17, which position is fixed by tightening mounting screws 54 into engagement with mounting tabs 52 and front member 17.

A light source 70, typically a light emitting diode, is provided within housing 10 on a side of scale 30 opposite the optical assembly. Light source 70 projects light through a condensing lens 72 and through the ruled patterns of scale 30 and reticle 60 to provide an intended fringe pattern for detection by photosensors 64. Back member 16 is removably attached to housing 10 to permit access to the light source for repair or replacement thereof. Electrical power is supplied to the light source through lead wires 74 extending into housing 18 for connection such as via a cable 75 to an external power source. Signals from photosensors 64 are coupled by wires 76 and cable 75 to assorted circuitry. Alternatively, circuitry can be provided within housing 18, the output signals therefrom being coupled to external utilization means by cable 75.

In typical operation of the invention, the housing 10 is attached to a stationary portion of a machine, and drive member 25 is affixed to a movable part of the machine which travels along a linear travel path. Longitudinal motion of drive member 25 is transmitted to scale 30 by coupler 42 causing the scale to move relative to the reticle. Light directed through the relatively moving scale and reticle produces a moving fringe pattern. The varying light and dark fringes are detected by photodetectors 64 to produce an output indication in response thereto which is processed by suitable processing circuitry and displayed by display means indicating the extent and sense of motion. The output of the encoder may also be applied to control circuits in an automated system.

Additional advantages of the invention reside in two features of its construction which permit components formed to relatively loose tolerances to be employed. In the assembly of the encoder of the invention, and prior to attachment of front member 17, runners 32 and 34 are positioned in respective grooves 36 and 38, defined respectively by base members 12 and 14, and scale 30 is positioned therebetween. Sections of cylindrical spacing members, typically plastic tubing of selected diameter, are inserted between the scale edges and the respective runners to provide secure mounting of the scale within housing 10 which allows only longitudinal motion of the scale along its axis of travel. An adhesive compound, typically epoxy, is inserted in the space between the runners and the respective scale edges and allowed to set and harden. Desired spacing between the reticle 6. and scale 30 is achieved, as noted above, by placing one or more shims 66 between surface 68 of housing 18 and the confronting surface of front member 17. The encoder of the invention typically has an overall length of approximately 6 inches and includes a 3-inch long scale, permitting 1½ inches of scale travel.

In alternative embodiment, the scale 30 can be driven along its linear travel path by a drive member which extends orthogonally to the plane of the scale and which is movable through an opening provided in the front or rear wall of the encoder housing. This alternative embodiment is illustrated in FIG. 3. An opening 100 is provided in the front wall of housing 101, a pair of confronting resilient members 102 and 104 being provided throughout the length of opening 100 to provide a seal through which a drive member 106 is movable to cause movement of the associated scale in its travel path within the housing while providing substantial isolation of the encoder interior from the ambient environment. The sliding seal can be as described in copending application Ser. No. 340,067 filed Mar. 12, 1973, entitled SEALED LINEAR ENCODER, assigned to the same assignee as the present invention. Insofar as the disclosure of the copending application is related to the present invention, it is incorporated herein by reference.

The drive member 106 is of bladelike configuration having tapered forward and rearward edges 108 and 110 for easy movement through the resilient seals. The drive member is connected to the end of scale 30 by means of a wire coupler 112 as shown, and which is operative similarly to the coupler described in the embodiment hereinabove. First and second grooves 114 and 116 can be formed in the front wall of the housing extending along the path of scale travel and in which respective pins 118 and 120 are disposed, these pins being attached to member 106. The pins serve to retain the drive member within the housing during assembly and disassembly thereof.

Figure 5:
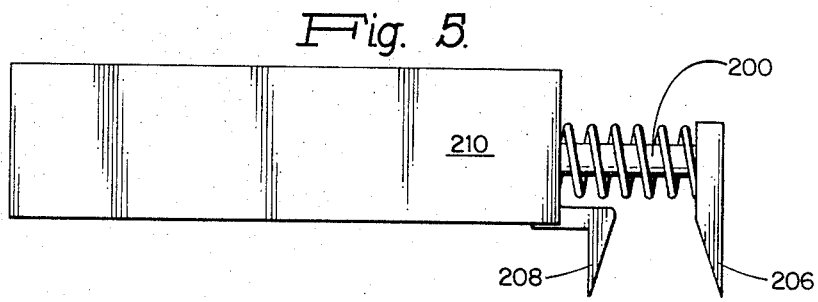
FIG. 5 is an elevation view of a further embodiment of the invention.
Figure 4:
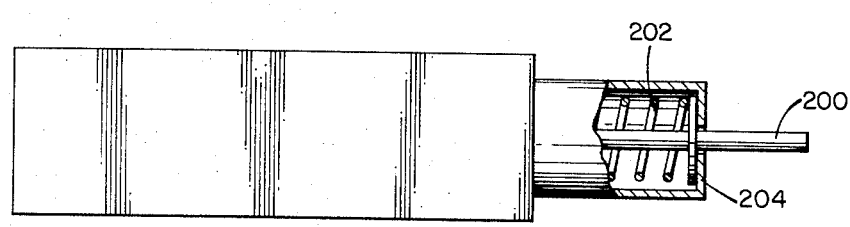
FIG. 4 is an elevation view, partly in section, of another embodiment of the invention.

The invention by reason of its relatively simple construction and small size can be employed as a hand held gauge to provide a digital output indication of particular measurements being made. The drive member of the novel encoder can be configured to suit the specific measuring requirement. For example, as shown in FIG. 4, an encoder according to the embodiment of FIGS. 1 and 2 has a shaft 200 which may be an extension of or a separate element affixed to drive member 25 and which is slidably movable against the urging of spring 202. This embodiment is operative as a depth gauge by insertion of shaft 200 into an opening the depth of which is to be measured until the flat surface 204 is in an engagement with the work surface in which the opening is provided. The corresponding movement of the scale provides an output indication of depth which can be displayed such as by means of a digital indicator. The guage can be initially calibrated by depressing shaft 200 into its depressed position with the end flush with end surface 204, and adjusting the display circuitry to read zero in this position. A further embodiment is illustrated in FIG. 5 wherein the invention is useful as a digital caliper gauge. A first caliper jaw 206 is affixed to the end of drive member 200, while a second caliper jaw 208 is affixed to the end of housing 210 adjacent the drive member. The output signals provided by the encoder can be suitably calibrated to provide an indication of the distance between jaws 206 and 208 such that a direct numerical indication of caliper measurement is provided.

Various modifications and alternative implementations of the invention will now occur to those versed in the art without departing from the spirit and true scope thereof. Accordingly, it is not intended to limit the invention by what has been particularly shown and described except as indicated in the appended claims.

What is claimed is:

1. An electro-optical linear encoder comprising:
    an elongated housing having a defined linear travel path therealong;
    an elongated rigid scale within said housing and having a plurality of alternately light responsive and non-responsive segments in parallel array along the longitudinal axis of one surface thereof, said scale being movable longitudinally within said housing;
    reticle means including a reticle fixed within said housing and having a plurality of alternately light responsive and non-responsive segments formed in a parallel array along a longitudinal axis of one surface thereof, the length of said reticle means along said longitudinal axis being less than the length of said elongated scale;
    sealing means affixed to said housing for substantially isolating the interior of said housing from the external environment;
    means for mounting said scale and reticle means for relative motion therebetween and along a longitudinal travel path within said housing and including:
    a drive member extending through said sealing means into said housing and arranged for bidirectional movement therethrough and for longitudinal motion relative to said reticle means; and
    means operative to couple said scale to said drive member in rigid relationship along the longitudinal axis of relative motion of said scale and in resilient relationship in at least one plane transverse to said longitudinal axis;
    means in said housing for directing light onto said scale and said reticle to provide a sensible fringe pattern; and
    sensor means within said housing for detecting said fringe pattern and for providing electrical signals in response thereto.

2. An electro-optical linear encoder according to claim 1 and further comprising at least two bearing members affixed to respective top and bottom edges of said scale, said bearing members having at least one bearing surface contacting said housing and for mounting said scale in said housing to permit motion of said scale only along said longitudinal travel path.

3. An electro-optical linear encoder according to claim 1 and further including restoring means coupled to said drive member and operative to restore said scale to a desired position in the absence of a driving force.

4. An electro-optical linear encoder according to claim 2 wherein said at least one bearing surface of said bearing members includes a friction reducing material.

5. An electro-optical linear encoder according to claim 1 wherein said reticle means includes means for adjustably mounting said plurality of alternately light responsive and non-responsive segments in predetermined orientation relative to said alternately light responsive and non-responsive segments on said scale to provide a desired fringe pattern.

6. An electro-optical linear encoder according to claim 1 wherein said sealing means is disposed at one end of said housing, and said drive member extends along an axis parallel to said scale.

7. An electro-optical linear encoder according to claim 1 including first and second gauge means connected to said drive member and said housing and operative to measure a distance therebetween.

8. An electro-optical linear encoder comprising:
    an elongated housing having a defined linear travel path therealong;
    an elongated scale within said housing and having a plurality of alternately light responsive and non-responsive segments in parallel array along the longitudinal axis of one surface thereof, said scale being movable longitudinally within said housing;
    reticle means including a reticle fixed within said housing and having a plurality of alternately light responsive and non-responsive segments formed in a parallel array along a longitudinal axis of one surface thereof;
    sealing means affixed to said housing for substantially isolating the interior of said housing from the external environment;
    means for mounting said scale and reticle means for relative motion therebetween and along a longitudinal travel path within said housing and including:
    a drive member extending through said sealing means into said housing and arranged for bidirectional movement therethrough and for longitudinal motion relative to said reticle means; and
    means operative to couple said scale to said drive member in rigid relationship along the longitudinal axis of relative motion of said scale and in resilient relationship in at least one plane transverse to said longitudinal axis and comprising a selectively resilient member coaxially disposed within a recess in said drive member to permit transverse motion of said coupling means within said recess;
    means in said housing for directing light onto said scale and said reticle to provide a sensible fringe pattern; and
    sensor means within said housing for detecting said fringe pattern and for providing electrical signals in response thereto.

9. An electro-optical linear encoder comprising:
    an elongated housing having a defined linear travel path therealong;
    an elongated scale within said housing and having a plurality of alternately light responsive and non-responsive segments in parallel array along the longitudinal axis of one surface thereof, said scale being movable longitudinally within said housing;
    reticle means including a reticle fixed within said housing and having a plurality of alternately light responsive and non-responsive segments formed in a parallel array along a longitudinal axis of one surface thereof;
    sealing means disposed in a wall of said housing parallel to said scale for substantially isolating the interior of said housing from the external environment;
    means for mounting said scale and reticle means for relative motion therebetween and along a longitudinal travel path within said housing and including:
    a drive member extending along an axis orthogonal to said scale and through said sealing means into said housing and arranged for bidirectional movement therethrough and for longitudinal motion relative to said reticle means; and means operative to couple said scale to said drive member in rigid relationship along the longitudinal axis of relative motion of said scale and in resilient relationship in at least one plane transverse to said longitudinal axis;

means in said housing for directing light onto said scale and said reticle to provide a sensible fringe pattern; and sensor means within said housing for detecting said fringe pattern and for providing electrical signals in response thereto.

10. An electro-optical linear encoder comprising:

an elongated, sealed, rigid housing having a defined linear path therealong;

an elongated rigid scale, shorter than said housing and disposed for linear travel within said housing along said path and having a plurality of alternately light responsive and non-responsive segments in parallel array along the longitudinal axis of one surface thereof;

reticle means including a reticle adjustably mounted for precise rotational alignment in said housing in a predetermined fixed spaced relationship with said scale, said reticle having a plurality of alternately light responsive and non-responsive segments formed in a parallel array along a longitudinal axis of one surface thereof, the length of said reticle means along said longitudinal axis being less than the length of said elongated scale;

sealing means affixed to said housing for substantially isolating the interior of said housing from the external environment;

means for mounting said scale and said reticle and along a longitudinal travel path within said housing and including:

a drive member extending through said sealing means into said housing and arranged for bidirectional movement through said sealing means and for longitudinal motion relative to said reticle means; and means operative to couple said scale to said drive member in rigid relationship along the longitudinal axis of relative motion of said scale and in resilient relationship in at least one plane transverse to said longitudinal axis and comprising a selectively resilient member coaxially disposed within a recess in said drive member to permit transverse motion of said coupling means within said recess;

means in said housing for directing light onto said scale and said reticle to provide a sensible fringe pattern; and sensor means within said housing for detecting said fringe pattern and for providing electrical signals in response thereto.

11. An electro-optical linear encoder according to claim 10 and further including:

a reticle support member containing said reticle and being adjustably positionable for precise rotational alignment with respect to said scale;

at least one shim disposed between an outer surface of said housing and the confronting outer surface of said reticle holding member for determining the spatial separation between said reticle and said scale.

12. An electro-optical linear encoder according to claim 10 wherein said sealing means is disposed in a wall of said housing parallel to said scale and said drive member extends along an axis orthogonal to said scale.

13. An electro-optical linear encoder according to claim 10 wherein said sealing means is disposed at one end of said housing and said drive member extends along an axis parallel to said scale.

* * * * *

UNITED STATES PATENT OFFICE
CERTIFICATE OF CORRECTION

PATENT NO. : 3,867,037
DATED : February 18, 1975
INVENTOR(S) : E. David Litke

It is certified that error appears in the above-identified patent and that said Letters Patent are hereby corrected as shown below:

Column 1, line 23, change "or" to read -- of --.

Column 3, line 9, change "is" to read -- in --.

Column 3, line 68, change "6." to read -- 60 --.

Column 7, line 35, change "said scale and said recticle and along a longitudinal travel path" to read -- said scale for relative motion between said scale and said reticle and along a longitudinal travel path --

Signed and Sealed this fourth Day of May 1976

[SEAL]

Attest:

RUTH C. MASON
Attesting Officer

C. MARSHALL DANN
Commissioner of Patents and Trademarks